T. A. ATKINSON.
BEE-HIVE.
No. 191,635.   Patented June 5, 1877.
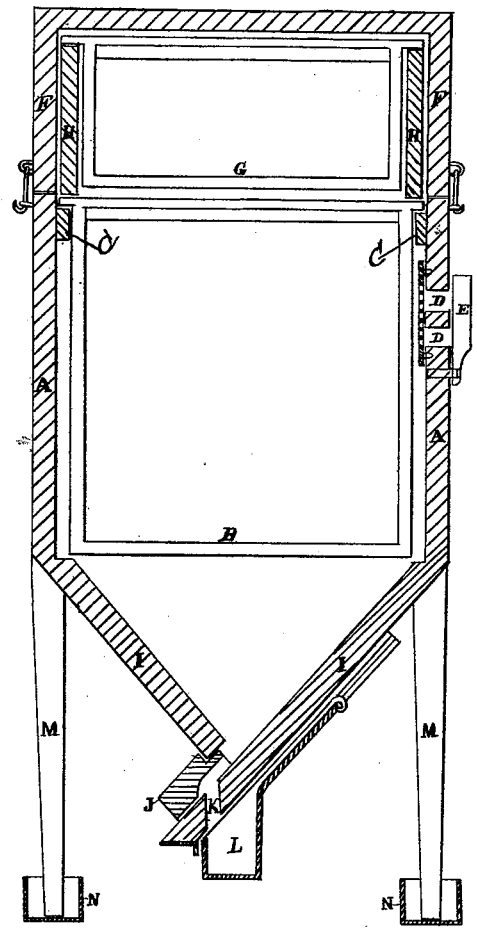

UNITED STATES PATENT OFFICE.

THOMAS A. ATKINSON, OF MERCED, CALIFORNIA.

IMPROVEMENT IN BEE-HIVES.

Specification forming part of Letters Patent No. 191,635, dated June 5, 1877; application filed March 29, 1877.

*To all whom it may concern:*

Be it known that I, THOMAS A. ATKINSON, of the town and county of Merced, and State of California, have invented an Improved Bee-Hive; and I do hereby declare the following to be a full, clear, and exact description thereof, reference being had to the accompanying drawings.

My invention relates to an improvement in bee-hives, which is more especially useful in preventing the ravages of the bee-moth, and which I call the moth exterminator or trap.

It is a well-known fact that the moth can go wherever the bee can go, and a moth-proof bee-hive is an impossibility. They may, however, be trapped and destroyed by the apiarian, and this my invention is designed to effect by providing artificial hiding-places, into which the worms will pass at the proper season, for the purpose of forming their cocoons and entering the chrysalis state, and they may be easily collected and destroyed from these receptacles.

Referring to the accompanying drawings for a more complete explanation of my invention, Figure 1 is a vertical transverse section of my hive.

A is the body of my bee-hive, containing the honey-frames B, which are so made that their upper bars project sufficiently to rest upon the cleats C at each side, and they are properly separated, so that any frame may be taken out at any time without disturbing the remainder. Holes D are bored in the sides of the hive, and protected by wire gauze or screens, and upon the outside is an adjustable button, E, by which the ventilating-openings may be regulated or entirely closed, at will.

The upper part F of my hive is made removable, and is secured by any suitable fastening devices. Honey-frames G are fitted within a box, H, which is glazed, so that its contents may be inspected at will. The bottom of my hive is made with the sides I inclined toward each other to form a V shape, and an entrance-opening is left between the lower edge of one of the inclined floor-boards and the other, which extends beyond, as shown, and forms an entrance-shelf. Blocks J, at each side of the center, serve to contract the entrance to a proper size, and small grooves are made upon the lower sides of these blocks, from their inner edges toward the center. These grooves communicate with tubes K, which lead down vertically through the bottom and open into a trough or receptacle, L, beneath the bottom. This trough may have slides, so that it can be placed or withdrawn by means of guides, or in any convenient manner.

The whole hive stands upon legs M, and these legs have cups N secured to the bottom, which may be filled with water, coal-oil, turpentine, or anything which will prevent the entrance of ants, roaches, and other insects.

The operation of my bee-hive will be as follows: The worms which may be concealed in the hive early in the spring are comparatively harmless; but if left to themselves they will enter the cocoon, emerge as flies, and lay thousands of eggs, which are hatched simultaneously, so that, before the bee-owner is aware of it, the bees are destroyed.

It is the habit of these worms, found in the hives in early spring, to let themselves down from the combs, and, after reaching the floor, to seek cracks and hiding-places, both to escape the bees and in order to enter the chrysalis state.

It will therefore be seen that when they reach the inclined floor of my hive they will find no place to hide until they reach the grooves in the entrance-blocks before described. Into these grooves they pass at once, and thence down the tubes K, whence they fall into the trough L, from which they cannot escape, but may be removed and destroyed at pleasure.

The peculiar construction of my hive favors the massing of the bees near the entrance, and this reduces the danger of the entrance of the moth-flies.

By the construction here described I am enabled to make my hive safe, economical, and easy of access.

Having thus described my invention, what I claim as new, and desire to secure by Letters Patent, is—

The combination, with a bee-hive having the V-shaped bottom I, tubes K, and receptacle L, of the blocks J, arranged on each side of the center of the bottom I, and each having a series of grooves, substantially as and for the purpose specified.

In witness whereof I have hereunto set my hand and seal.

THOMAS ALBION ATKINSON. [L. S.]

Witnesses:
 M. T. HUBBARD,
 CHAS. M. BLAIR.